US007497357B2

(12) United States Patent
Brahim et al.

(10) Patent No.: US 7,497,357 B2
(45) Date of Patent: Mar. 3, 2009

(54) FIXING MEMBER FOR FITTING A PUMP OR A VALVE ON A RESERVOIR

(75) Inventors: Xavier Brahim, Conches en Ouche (FR); Alain Lafosse, Louversey (FR)

(73) Assignee: Valois S.A.S., Le Neubourg (FR)

( * ) Notice: Subject to any disclaimer, the term of this patent is extended or adjusted under 35 U.S.C. 154(b) by 452 days.

(21) Appl. No.: 10/525,253

(22) PCT Filed: Dec. 3, 2003

(86) PCT No.: PCT/FR03/03566

§ 371 (c)(1),
(2), (4) Date: Feb. 22, 2005

(87) PCT Pub. No.: WO2004/052553

PCT Pub. Date: Jun. 24, 2004

(65) Prior Publication Data

US 2005/0230428 A1 Oct. 20, 2005

(30) Foreign Application Priority Data

Dec. 5, 2002 (FR) .................................. 02 15323

(51) Int. Cl.
*G01F 11/00* (2006.01)

(52) U.S. Cl. .................................... 222/321.7; 215/274

(58) Field of Classification Search ............. 222/321.2, 222/321.7, 321.9, 385, 402.1, 321.1, 321.6, 222/364; 215/273–280, 330; 220/315, 319, 220/324

See application file for complete search history.

(56) References Cited

U.S. PATENT DOCUMENTS 4,984,702 A * 1/1991 Pierpont ..................... 215/272
5,642,908 A * 7/1997 Mascitelli .............. 285/148.19
5,941,428 A * 8/1999 Behar et al. ............. 222/321.7
6,186,359 B1 2/2001 De Pous et al.
6,364,181 B1 4/2002 Garcia et al.
6,935,540 B2 * 8/2005 Ackermann .............. 222/321.7
2002/0076271 A1 6/2002 Beranger et al.

FOREIGN PATENT DOCUMENTS

FR 2779419 A 12/1999
WO WO 01/23278 A1 4/2001

OTHER PUBLICATIONS

International Search Report for PCT/FR03/03566 dated Apr. 7, 2004.

* cited by examiner

*Primary Examiner*—Lien T Ngo
(74) *Attorney, Agent, or Firm*—Sughrue Mion, PLLC

(57) ABSTRACT

A fastener member (1) for fastening a dispenser member (4) on a fluid reservoir, the fastener member (1) having a fastener ring (2) and a covering hoop (3). The fastener ring (2) includes a reception device that receives the dispenser member (4), and a fastener device that fastens on the reservoir, the covering hoop (3) being mounted by axial engagement around the ring (2) in such a manner as to mask it at least in part. The hoop (3) includes a hook co-operating with a retention device (225) formed by the ring (2), the hook (35) prevents the hoop (3) from rotating around the ring (2) and preventing the hoop (3) from moving in axial translation. The retention device formed by the ring (2) includes a retention housing (225) that co-operates with the hook. The hook includes at least one barb profile (352) adapted to bite into the housing.

8 Claims, 2 Drawing Sheets

FIXING MEMBER FOR FITTING A PUMP OR A VALVE ON A RESERVOIR

FIELD OF INVENTION

The present invention relates to a fastener member for fastening a dispenser member, such as a pump or a valve, for example, on a reservoir for containing a fluid, or even a powder. This type of fastener member is often used in the fields of perfumery, cosmetics, or even pharmacy for fastening pumps or valves on fluid containers.

BACKGROUND

In conventional manner, a fastener member comprises a fastener ring, generally made of plastics material, associated with a covering hoop which can be made of metal or of plastics material. The covering hoop is mounted around the ring in such a manner as to mask it at least in part, thereby advantageously imparting an attractive appearance aspect thereto. In conventional manner, the covering hoop is axially force fitted around the fastener ring, and in principle this friction-clamped contact suffices on its own to secure the hoop on the ring. However, the hoop often turns about the ring, or becomes axially disengaged when very limited force is exerted.

Document FR-2 799 185 provides a partial solution to the problem of fastening the hoop securely on the ring. In that document, the covering hoop is clamped onto the inside of a bushing formed by the ring. Clamping aims to prevent both turning and movement in axial translation. However, even with such internal clamping, the hoop can still turn on the ring. Clamping is more particularly adapted to preventing movement in translation, and apart from a clamping contact, it does not implement specific means for preventing turning.

Document FR-2 779 419, on which the pre-characterizing portion of the main claim is based, describes a pump mounted in a ring which is force-fitted into a reservoir neck. On its outside, the ring forms a groove for engaging with teeth formed inside a cover. The teeth prevent both turning and movement in translation. The teeth are in the form of rectangular studs that project from the inside wall of the cover. However, it is not mentioned clearly how the teeth are held in the groove.

CERTAIN OBJECTS OF INVENTION

The object of the present invention is to remedy the above-mentioned hoop-securing problems by defining a fastener member having a hoop that is secured on the ring in completely stable and secure manner.

In order to achieve this object, the present invention provides a fastener member for fastening a dispenser member, such as a pump or a valve, on a fluid reservoir, said fastener member comprising a fastener ring and a covering hoop, the fastener ring including reception means for receiving the dispenser member, and fastener means for fastening on the reservoir, the covering hoop being mounted by axial engagement around the ring in such a manner as to mask it at least in part, the hoop including hook means co-operating with retention means formed by the ring, said hook means include means for preventing the hoop from rotating around the ring and means for preventing the hoop from moving in axial translation, and thereby becoming axially disengaged from the ring, the retention means formed by the ring including at least one retention housing that is accessible by axial engagement, said means for preventing both turning and movement in translation co-operating with the retention housing, the fastener member being characterized in that the means for preventing movement in translation include at least one barb profile adapted to bite into the housing.

The means for preventing turning advantageously include at least one fastener element that is axially engaged in the retention housing.

The barb profile is advantageously formed by the fastener element. Thus, the means for preventing movement in translation, and the means for preventing turning, are formed by a single fastener element which co-operates with a single retention housing. Naturally, it is possible to provide a plurality of fastener elements co-operating with a plurality of respective retention housings. However, a single fastener element incorporates both means for preventing turning, and means for preventing movement in axial translation. In contrast to the teeth of the above-mentioned document, the barb profile is effective in preventing movement in translation.

In a practical embodiment, the ring includes a bushing defining a free end, the bushing forming said at least one retention housing, the hoop including a free bottom end, and a top end forming an inwardly-directed rim, the fastener element being connected to said rim and pointing substantially towards the bottom end of the hoop in such a manner that the fastener element penetrates into the retention housing while the hoop is being mounted, by axial engagement, on the ring. The fastener element advantageously reaches a final fastening position in its retention housing when the inwardly-directed rim comes into abutment against the free end of the bushing.

According to a characteristic of the invention, the retention housing is defined by two opposite, vertical, longitudinal walls, the fastener element being engaged with said walls. The barb profile is advantageously adapted to bite into said walls.

The ring can be made of a plastics material, and the hoop can be made of metal or of a plastics material that is harder than the plastics material of the ring.

BRIEF DESCRIPTION OF THE FIGURES

The invention is described more fully below with reference to the accompanying drawings which show an embodiment of the invention by way of non-limiting example.

In the figures.

DETAILED DESCRIPTION OF CERTAIN EMBODIMENTS OF INVENTION

Figure 1:
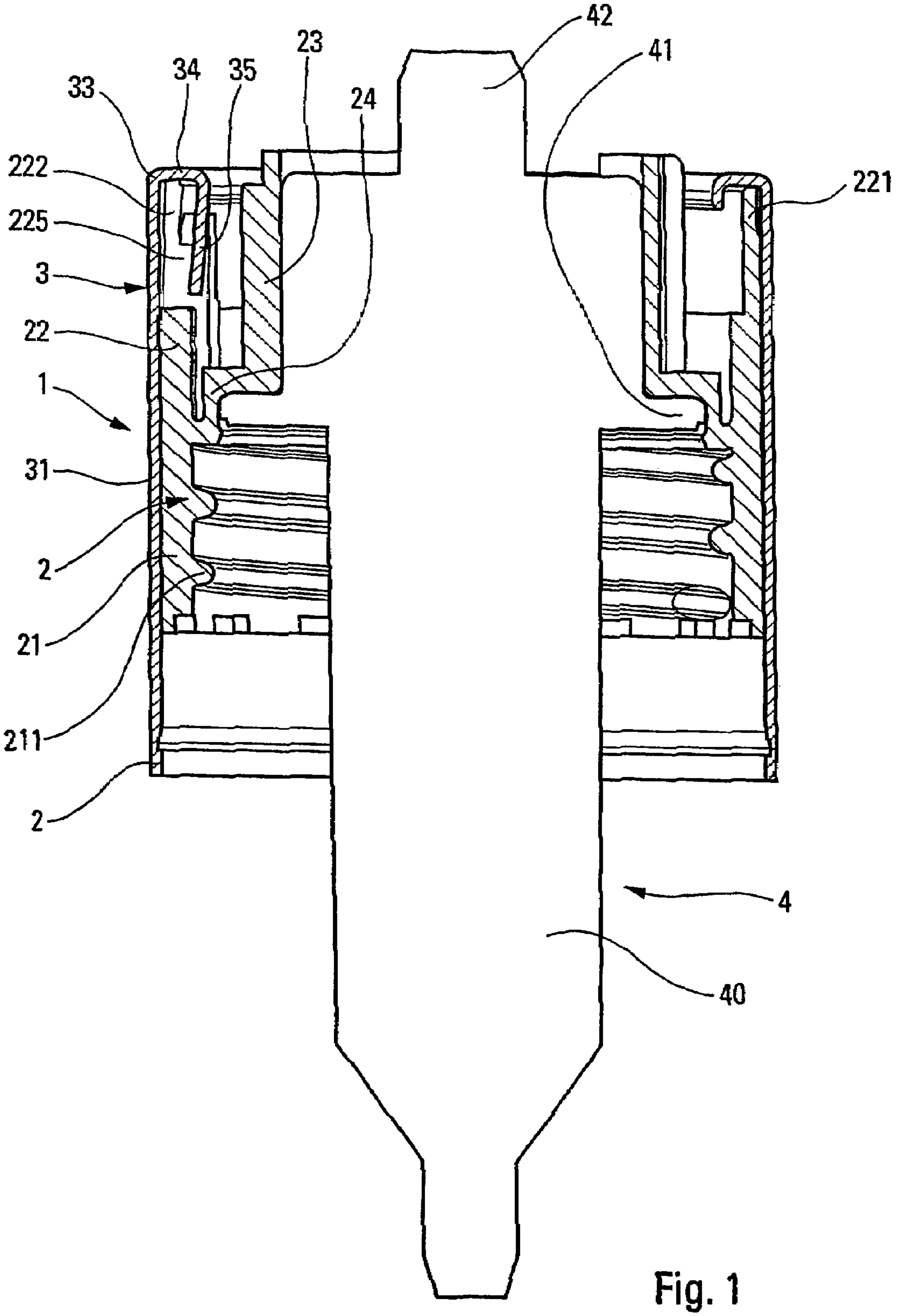
FIG. 1 is a vertical section view through a fastener member of the invention, in which a dispenser member is mounted.

The fastener member shown in the figures is designated, as a whole, by the numerical reference 1, and advantageously comprises two component elements, namely a fastener ring 2, and a covering hoop 3.

The covering hoop 3 is mounted around the fastener ring 2 and fulfils an appearance function, but sometimes also fulfils a fastening function.

The fastener ring 2 includes fastener means that are capable of co-operating with a reservoir (not shown), or more precisely with an opening of the reservoir which can be in the form of a projecting neck, for example. The fastener ring 2 is more particularly adapted to co-operate with the outside wall of the opening of the reservoir which is advantageously made with one or more grip shapes. By way of example, the grip shapes can be in the form of an outside thread, or even in the form of a thick rim forming a bottom grip shoulder. In the present example, the fastener ring includes a fastener skirt 21, which is provided internally with an inside thread 211 for co-operating with a corresponding thread formed on the outside wall of a neck of the reservoir or receptacle. Without changing the spirit of the invention, the fastener skirt 21 could also be provided with grip or snap-fastener heads for co-operating with a corresponding catch rib formed on the outside wall of a receptacle neck. More generally, the fastener ring includes a fastener skirt 21, making it possible to fasten the fastener ring on a receptacle in stable manner.

The fastener ring 2 also includes reception means for receiving a dispenser member in secure manner. The dispenser member 4, which is shown in very diagrammatic manner in FIG. 1, can be a pump or a valve. Its internal structure is not relevant to the present invention, which is why it is not even shown. The dispenser member 4 generally comprises a body 40 in which a valve 42 is axially displaceable. The body 40 can form, or be provided with, a fastener collar 41 for co-operating with the reception means formed by the fastener ring 2. In the present example, the fastener ring forms a snap-fastener housing 24 into which the collar 41 of the dispenser member 4 is force-fitted and held in secure manner. In order to improve the stability of the dispenser member 4 in the fastener ring 2, the ring also forms a holding sleeve 23 in which the dispenser member 4 is engaged.

In addition, the fastener ring 2 forms a bushing 22 which can advantageously extend in line with the fastener skirt 21. The skirt 21 can extend downwards, while the bushing 22 extends upwards to terminate in a free top end 221. The bushing 22 can have the same diameter as the diameter of the skirt 21, or it can have a different diameter. By referring to FIG. 3, it can be seen more clearly that the bushing 22 of the ring 2 forms a retention housing 225 which is upwardly open. In this case, the retention housing 225 is defined by two walls 224 which extend substantially vertically, facing each other. The distance between the two walls determines the width of the housing. From the top opening, this distance can be constant, increasing, or decreasing. The walls 224 are formed, at least in part, by two longitudinal vertical flanges 223 formed on the inside wall of the bushing 22. The walls 224 thus comprise both a vertical component, and also a radial component. Preferably but not necessarily, the bushing 22 forms a notch 22 at the retention housing 225. However, it is possible to envisage a bushing without such a notch 222 so that the bushing is complete and continuous over its entire periphery at its top end 221. In this example, the retention housing 225 is formed inside the bushing only by the walls 224 of the two flanges 223. In the figures, only a single retention housing 225 can be seen, but a plurality of retention housings 225, e.g. distributed evenly over the periphery of the bushing 22, could very well be provided.

In this case, the covering hoop 3 comprises an accurately cylindrical sleeve 31 presenting a bottom end 32 and a top end 33. The inside diameter of the sleeve 31 is advantageously equal to, or slightly less than, the maximum outside diameter of the fastener ring 2. The sleeve 31 of the hoop 3 can thus be engaged with a friction-clamped contact around the fastener ring 2 in order to achieve primary fastening. At its top end 33, the hoop 3 forms an inwardly-directed peripheral rim 34 which can advantageously form a small turned edge 341 that is directed downwards, substantially parallel to and concentric with the sleeve 31.

In the invention, the covering hoop 3 forms a fastener element 35 which prevents the hoop both from rotating and from moving in axial translation on the ring. The fastener element 35 is made as a single piece with the covering hoop. However, the functions of preventing turning and of preventing movement in axial translation could be disassociated in such a manner as to be provided by two distinct elements, but in the invention, the two prevention functions are preferably provided by a single fastener element 35. The fastener element 35 extends in line with the turned edge 341 or of the inwardly-directed rim 34, pointing downwards towards the bottom end 32 of the hoop. In this case, the fastener element 35 is in the form of an arrow forming a substantially straight body 351, at the end of which there is formed a barbed head forming one or two barb profiles 352. Naturally, it is possible to envisage a fastener element formed with a single barb only, or even with more than two barbs. The fastener element 35 extends substantially axially, and also tangentially.

Figure 2:
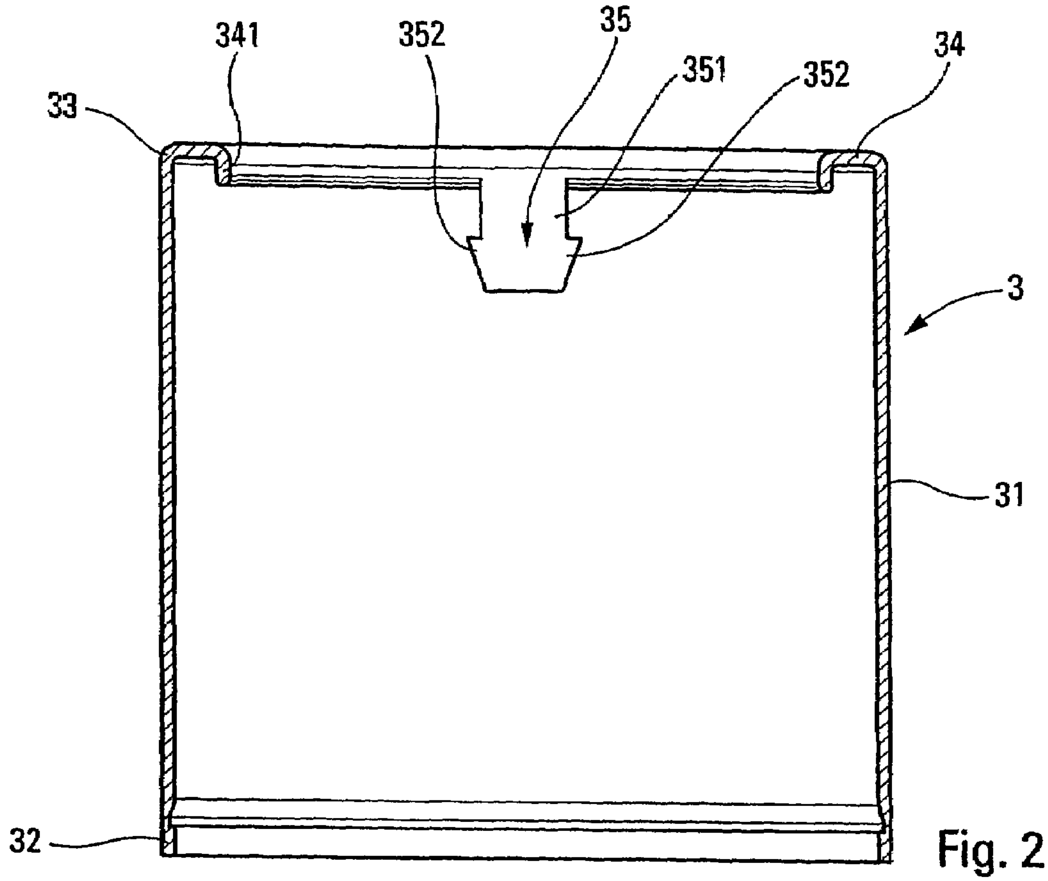
FIG. 2 is a vertical section view through the covering hoop of a fastener member of the invention.
Figure 3:
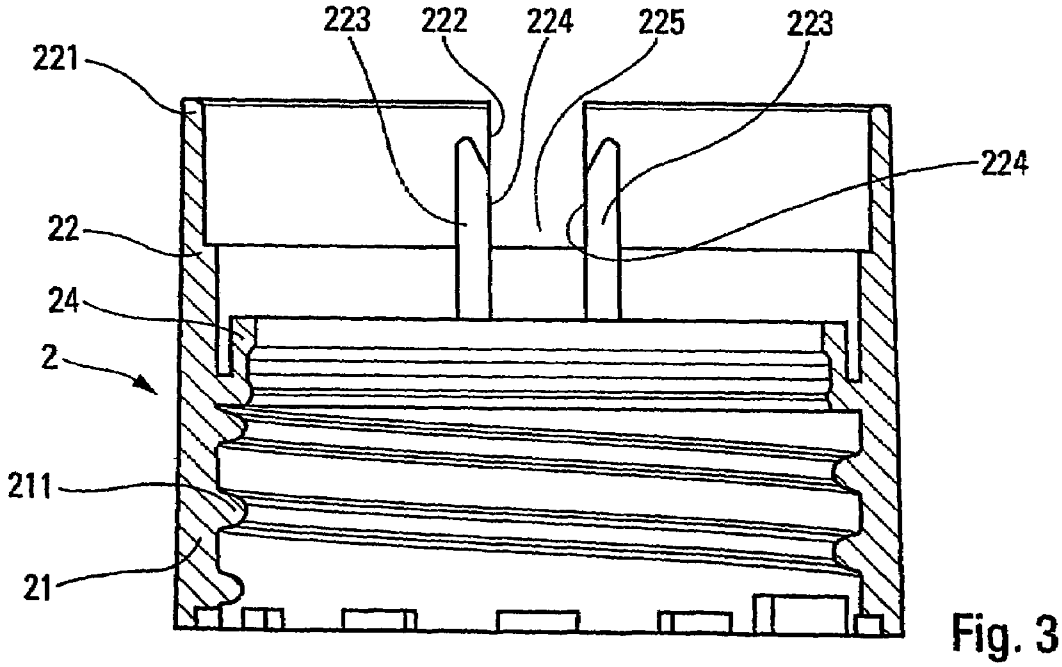
FIG. 3 is a vertical section view through a fastener ring of a fastener member of the invention.

By referring simultaneously to FIGS. 2 and 3, it can easily be understood that by engaging the covering hoop 3 axially on the fastener ring 2, the fastener element 35 becomes axially engaged inside the retention housing 225 formed by the bushing 22 of the fastener ring 2. Naturally, the covering hoop 3 must be correctly oriented beforehand, so as to axially align the fastener element 35 with the retention housing 225. The fastener element 35 can thus penetrate into the housing 225 while the hoop is being mounted on the ring, without the need for any additional operation. The fastener element 35 becomes positioned between the two walls 224 of the housing 225, thereby already preventing the hoop from rotating on the ring. The body 351 of the fastener element 35 can present a width that is not greater than the distance between the two walls 224 of the housing 225. However, the width of the head at the fastener profiles 352 is greater than the distance between the two walls 224 of the housing 225. As a result, engagement of the fastener element 35 in the housing 225 causes the fastener profiles 352 to bite into the walls 224 of the housing 225. As a result of their configuration, the barbs 352 can be inserted into the housing 225 under limited pressure, while their removal is made impossible as with a conventional barb. Movement in axial translation is thus prevented.

In this case, it should be noted that the functions of preventing turning and of preventing movement in axial translation are provided by a single fastener element co-operating with a single retention housing. Naturally, it is possible to provide a plurality of fastener elements 35, advantageously distributed in even manner over the periphery of the inwardly-directed rim 34 of the hoop 3. The fastener ring 2 can be made of a plastics material. With regard to the covering hoop 3, it can also be made of a plastics material, but its fastener element 35 must be made of a plastics material that is harder, so as to be able to fulfill its barb function. The covering hoop 3 is preferably made of metal.

Although, in this embodiment, the sleeve 31 of the hoop 3 is in clamping contact with the ring 2, an embodiment in which the sleeve 31 is not in clamping contact with the fastener ring 2 could very well be envisaged. The hoop would then be secured on the ring entirely by engaging the fastener element(s) 35 in one or more respective retention housings. In this case, the fastener element(s) is/are provided at the inwardly-directed rim of the hoop. However, they can be located at another location on the hoop, e.g. at the bottom of the hoop.

The invention claimed is:

1. A fastener member (1) for fastening a dispenser member (4) on a fluid reservoir, said fastener member (1) comprising a fastener ring (2) and a covering hoop (3), the fastener ring (2) including reception means (24) for receiving the dispenser member (4), and fastener means (211) for fastening on the reservoir, the covering hoop (3) being mounted by axial engagement around the ring (2) in such a manner as to mask it at least in part, the hoop (3) including hook means (35) co-operating with retention means (225) formed by the ring (2), said hook means (35) include means (351, 352) for preventing the hoop (3) from rotating around the ring (2) and means (352) for preventing the hoop (3) from moving in axial translation, and thereby becoming axially disengaged from the ring (2), the retention means formed by the ring (2) including at least one retention housing (225) that is accessible by axial engagement, said means for preventing both turning and movement in translation co-operating with the retention housing (225), the means for preventing movement in translation including at least one barb profile (352) adapted to bite into the housing, wherein the retention housing (225) is defined by two opposite, vertical, longitudinal walls (224), the hook means (35) being engaged with said walls (224).

2. A fastener member according to claim 1, in which the means for preventing turning include at least one fastener element (35) that is axially engaged in the retention housing (225).

3. A fastener member according to claim 2, in which the barb profile (352) is formed by the fastener element (35).

4. A fastener member according to claim 1, in which the ring (2) includes a bushing (22) defining a free end (221), the bushing forming said at least one retention housing (225), the hoop (3) including a free bottom end (32), and a top end (33) forming an inwardly-directed rim (34), the hook means (35) being connected to said rim and pointing substantially towards the bottom end (32) of the hoop in such a manner that the hook means (35) penetrates into the retention housing (225) while the hoop (3) is being mounted, by axial engagement, on the ring (2).

5. A fastener member according to claim 4, in which the hook means (35) reaches a final fastening position in its retention housing (225) when the inwardly-directed rim (34) comes into abutment against the free end (221) of the bushing (22).

6. A fastener member according to claim 1, in which the barb profile (352) is adapted to bite into at least one of said walls (224).

7. A fastener member according to claim 1, in which the ring (2) is made of a plastics material, and the hoop (3) is made of metal or of a plastics material that is harder than the plastics material of the ring.

8. The fastener member according to claim 1, further comprising an attached pump or valve.

* * * * *